United States Patent [19]
Jacobs et al.

[11] Patent Number: 5,307,328
[45] Date of Patent: Apr. 26, 1994

[54] MAGNETO-OPTICAL SCANNING DEVICE WITH SMALL COIL

[75] Inventors: Bernardus A. J. Jacobs; Petrus A. M. Van Grinsven; Wilfred A. M. Snijders; Johannes H. M. Spruit, all of Eindhoven, Netherlands

[73] Assignee: U.S. Philips Corporation, New York, N.Y.

[21] Appl. No.: 950,107

[22] Filed: Sep. 23, 1992

[30] Foreign Application Priority Data

Dec. 30, 1991 [EP] European Pat. Off. ........ 91203428.7

[51] Int. Cl.⁵ .............................................. G11B 11/00
[52] U.S. Cl. ........................................ 369/13; 360/59; 360/114; 365/122
[58] Field of Search ............... 369/13, 14, 100, 102, 369/110-112, 109, 116-118, 121, 124, 44.14, 44.15; 360/59, 114, 103; 365/122; 359/280

[56] References Cited

U.S. PATENT DOCUMENTS

| | | | |
|---|---|---|---|
| 3,781,905 | 12/1973 | Bernal et al. | 365/122 |
| 4,890,178 | 12/1989 | Ichihara | 360/114 |
| 5,124,961 | 6/1992 | Yamaguchi et al. | 369/13 |

FOREIGN PATENT DOCUMENTS 0341778 11/1989 European Pat. Off.
3-181045 8/1991 Japan.

Primary Examiner—Robert J. Pascal
Assistant Examiner—Ali Neyzari
Attorney, Agent, or Firm—David R. Treacy

[57] ABSTRACT

A device for writing, reading or erasing a record carrier has a coil with a winding arranged between an objective lens and the record carrier. Optical radiation is focused to a spot, the converging beam passing through the coil opening. A core of a transparent material, having an index of refraction which significantly decreases vergence of the focused beam, is placed in the winding opening. As a result the diameter of the coil can be reduced, and permit increase of the generated magnetic field.

20 Claims, 2 Drawing Sheets

MAGNETO-OPTICAL SCANNING DEVICE WITH SMALL COIL

BACKGROUND OF THE INVENTION

The invention relates to device for scanning a magneto-optical recording layer, comprising a radiation source and an objective system for forming a radiation beam focused to a scanning spot on the recording layer, and a magnet coil comprising a winding with a core arranged between the objective system and the recording layer for generating a magnetic field at the location of the scanning spot. The core of a coil is meant to be the central part of the coil inside the winding.

Magneto-optical record carriers can be written and read by means of such a device. There are two writing methods. In the first method there is a constant magnetic field at the location of the scanning spot, while the radiation intensity of this scanning spot is modulated, dependent on the information to be recorded. In the second method the intensity of the scanning spot during writing is constant or modulated at a fixed frequency and the polarity of the magnetic field changes in dependence upon the information. The second method yields a greater information density than the first method and it is possible to overwrite prerecorded information directly with new information. However, it is a problem to realise the required power and the rapid changes of the field at the location of the scanning spot.

A device of the type described above is known from U.S. Pat. No. 3,781,905. In this device the magnetic field is generated by a coil arranged between the objective system and the record carrier. The coil has an air core through which the focused radiation beam passes. A drawback of the known coil is that the core is relatively large so that a large electric power is necessary to generate the required magnetic field. This in turn leads to inadmissable heating of the coil. A further drawback of the known coil is that its height makes it difficult to arrange it in the small space which is available between the objective system and the record carrier.

SUMMARY OF THE INVENTION

It is an object of the invention to provide a device in which the coil requires a smaller electric power and in which a larger space for accommodating the coil is realised.

To this end a device according to the invention is characterized in that the core comprises a transparent material throughout the height of the winding, in which core the vergence of the radiation beam is smaller than the vergence of the radiation beam in the medium surrounding the coil, and in that the maximum inner diameter of the winding is substantially equal to the maximum diameter of the radiation beam in the winding. Due to the smaller vergence of the radiation beam in the core of the coil, the distance between the objective system and the record carrier may become larger and the diameter of the core may become smaller. By winding the turns of the coil as densely as possible on the core, the required power for the coil is reduced. A further advantage of the solid core is that dust particles, which could obstruct the radiation beam, cannot accumulate in the core. Moreover, the solid core can be used as a winding jig for the coil.

A particular embodiment of the device according to the invention is characterized in that the core is a truncated cone having an apex angle which is equal to the apex angle of the radiation beam in the core. As a result, the diameter of the core can be still further reduced so that the power consumption will even be smaller.

By giving at least one surface of the core a curvature it is possible to influence the properties of the radiation beam to a further extent. For example, by giving a surface optical power, the diameter of the core can be further reduced. The core then has a converging effect and may take over a part of the function of the objective system.

In a special embodiment of the device according to the invention the objective system is integrated with the core. The device can be made more compact by integrating the objective system and the coil.

In a special embodiment of the device the core projects slightly below the winding. This has the advantage that, if the record carrier were to touch the coil, it would touch the hard core instead of the vulnerable winding of the coil.

A particular embodiment of the device according to the invention is characterized in that the coil has a yoke of magnetic material. The yoke provides a concentration of magnetic flux at the location of the scanning spot so that less power is necessary to generate the required magnetic field. Moreover, the yoke dissipates heat generated in the winding.

The invention will now be described in greater detail with reference to some embodiments and the accompanying drawings.

DESCRIPTION OF THE PREFERRED EMBODIMENT

Figure 1:
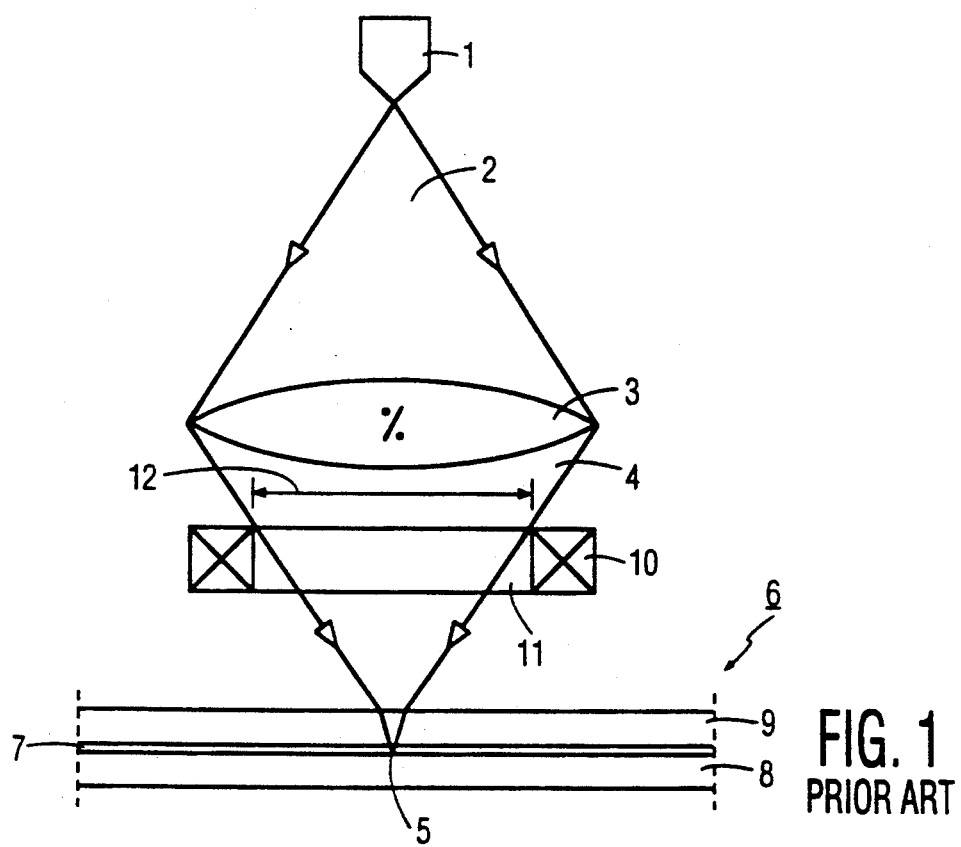
FIG. 1 shows a part of a known scanning device with a known coil.

FIG. 1 shows a part of a scanning device as is known from, inter alia, said U.S. Pat. No. 3,781,905. A radiation source 1, for example a laser diode, supplies a beam 2 which is transformed to a focused radiation beam 4 by an objective system comprising, for example, one lens 3. The radiation beam 4 forms a spot 5 on a recording layer 7 of a record carrier 6 which is suitable for magneto-optical recording. The recording layer is provided, for example, on a substrate 8 and coated with a transparent protective coating 9 on the side of the scanning head. If a transparent substrate is used, the positions of components 8 and 9 may be interchanged. The lens 3 is positioned by known servomechanisms (not shown) along the optical axis and perpendicularly thereto in such a way that the spot 5 remains at the desired location on the recording layer 7 while the record carrier is being scanned. The known optical and electric elements required for generating an information signal and servosignals are not shown in the Figure.

The magnetic field at the location of the spot 5, which field is required for writing and erasing information in the recording layer 7, is generated by a magnet coil having a winding 10. This known coil has a cylindrical shape with an opening which defines an air core 11 which is also cylindrical and passes the focused radiation beam 4. The magnetic field must be large enough to reverse the magnetization of the recording layer 7 heated by the spot 5. To minimize the power consumption and the resultant heating of the coil, the coil must generate a magnetic field which is as large as possible at a given electric power. The magnetic field on the axis of the coil rapidly decreases with a decreasing distance to the coil. For this reason the coil 10 should be arranged as close as possible to the spot 5. The minimum distance between the coil and the spot is determined by the thickness of the protective coating 9, or the transparent substrate 8 and by the vertical excursions of the record carrier 6 during scanning. By coupling the coil 10 mechanically to the lens 3 whose height is adjustable, the coil, likewise as the lens, will be in compliance with the surface of the record carrier as satisfactorily as possible. The minimum distance between the coil and the protective coating is determined by the permitted record carrier flatness tolerance of the device and by the vertical movements to be expected between the coil and the record carrier in case of shocks against the device. Furthermore, the magnetic field strength at a point on the axis not too far beyond the coil is inversely proportional to the diameter of the winding so that a large field requires a small diameter. The minimum inner diameter is fixed due to the shape of the focused radiation beam 4. In the known coil 10 the inner diameter 12 of the core and the distance between the coil and the protective coating 9 are fixed. A good compromise between tolerance and field strength is a coil-to-spot distance which is approximately equal to the diameter of the coil. The addition of extra turns to the outer side of the winding 10 so as to enlarge the field at the location of the spot 5 is not efficient because the distance between these turns and the spot is relatively large.

A further requirement imposed on the coil is that the magnetic field should be able to reverse its polarity rapidly so as to maximize the writing speed. Since the reactance of a coil increases linearly with the frequency of the coil control and with the inductance, the coil should have a low inductance to convey sufficient current through the winding at high frequencies. Since the inductance of a coil is directly proportional to the square of the diameter of the coil, the coil should thus have a diameter which is as small as possible. This also has the advantage that the winding has a small overall length so that the coil has a small resistance and hence a low power dissipation. However, the diameter of the known coil cannot be reduced to a sufficient extent due to the above-mentioned requirements imposed on the coil.

Figure 2:
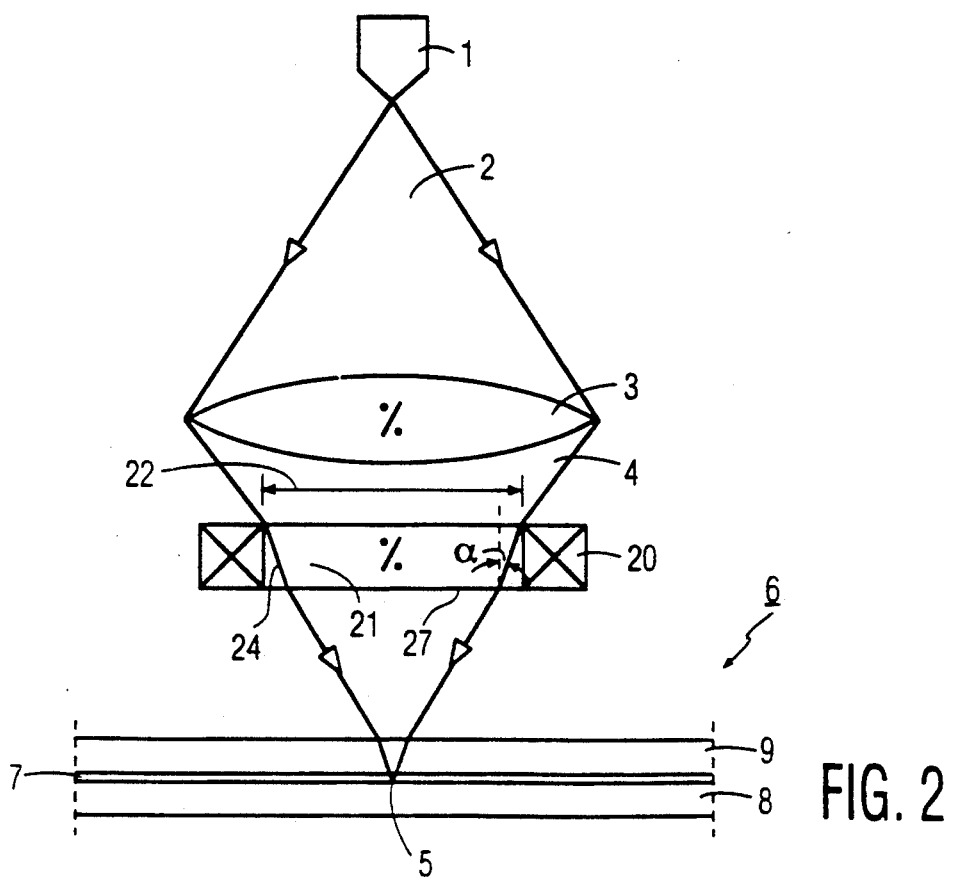
FIG. 2 shows such a device with a coil according to the invention.

In the device according to the invention, as shown in FIG. 2, the diameter of the coil 20 can be reduced in comparison with the coil 10, namely by filling up the opening with a core 21 with a transparent material, for example, glass. Since the core has a refractive index of more than 1.0, the rays entering the core are bent towards the normal so that the apex angle $2\alpha$ of the focused beam 4 in this core is smaller than in an air core. Consequently, the beam 24 at the location of the upper side of the coil may have a smaller cross-section for obtaining the same spot 5 on the recording layer 7 as compared with the case of an air-cored coil. While the distance between the coil and the record carrier remains the same, the winding may have a smaller inner diameter 22 as is illustrated by the comparison of FIGS. 1 and 2. The inner diameter of the winding is made as small as possible, without vignetting, by choosing the diameter of the core to be equal to the maximum diameter of the radiation beam 24 in the core, possibly increased by a small manufacturing tolerance, and by providing the winding directly on the core or on a thin intermediate layer on the core. For conventional devices the reduction of the core diameter is between 20% and 40% of the height of the winding, dependent on the numerical aperture (NA) of the lens 3 and the refractive index of the core. It is preferred to use a material having a high refractive index for the core because the reduction increases with the refractive index.

The transparent core is preferably also soft-magnetic. It is to be noted that a coil having a transparent, magnetic core is known from Japanese Patent Application No. 3-181 045. However, in this coil no measures have been taken to reduce the inner radius of the winding so as to increase the magnetic field.

If the diameter of the winding 20 according to the invention is 10% smaller than that of the known coil, it yields a 10% larger magnetic field at the location of the spot 5 when the same current is supplied to the coil. Moreover, since the impedance of the coil, composed of a resistance part and a reactance part, is at least 10% smaller than that of the known coil, the field is at least 20% larger than that of the known coil in the case of the same power consumption. Since the core changes the vergence of the beam 24, the distance between the lens 3 and the record carrier 6 will be larger so that there will be more space for accommodating the coil between the lens and the record carrier. A typical winding for high-frequency writing of information has an inner diameter of 0.1 mm and a height of 0.1 mm, while the distance between the lower side of the coil and the spot is 0.1 mm.

Figure 3:
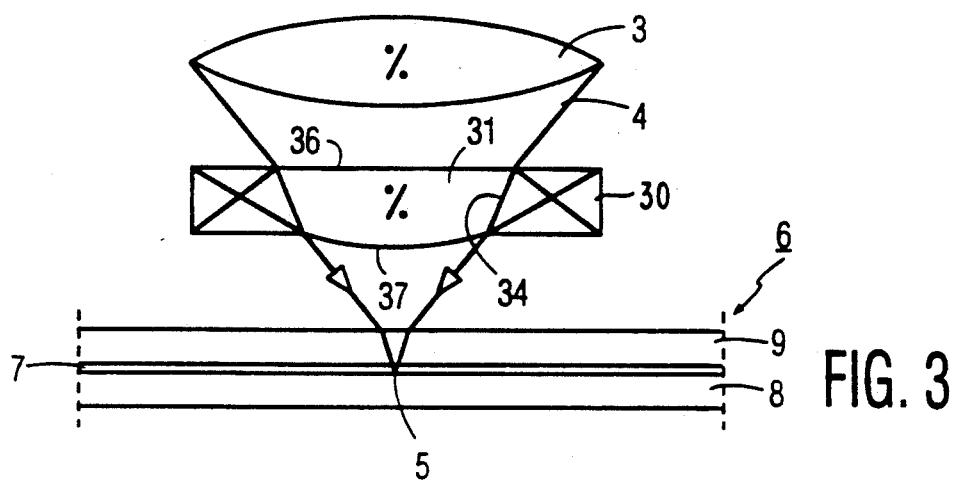
FIG. 3 shows a special embodiment of the coil according to the invention.

FIG. 3 shows a special embodiment of the coil according to the invention. The core 31 has the shape of a truncated cone so that the inner diameter of the coil is in compliance with the shape of the focused beam 34 in the core. Consequently, additional turns having also an extra small diameter can be arranged at the lower side of the coil 30. Due to said dependence of the generated magnetic field on the geometry of the winding, these additional turns contribute to the field at the location of the spot 5 to a relatively large extent. As compared with the coil 20 shown in FIG. 2, the increase of the field at the location of the spot due to the core shape shown in FIG. 3 may be 10%.

If the core 21 or 31 shown in FIGS. 2 and 3 is made of, for example glass or plastic, it can be used as a winding jig in the manufacture of the coil 20 or 30. If the coil is made on another winding jig, the core of the coil may be filled after winding with a viscous transparent synthetic material which is subsequently cured, for example by means of ultraviolet radiation.

The end surfaces 27 or 37 of the core 21 and 31, as shown in FIGS. 2 and 3, may be given a curvature, i.e. a non-plane shape at the upper side and/or the lower side. By giving one of the sides of the end surface a small deviation, referred to in literature as making aspherical, it is possible to correct for optical aberrations. When a lens 3 is used which is designed for a device with an air core 11 in the radiation beam 4, the provision of a core having a higher refractive index will cause spherical aberration in the radiation path. This aberration can then be compensated for by means of an aspherical surface on the core. Such a surface can easily be realised by making use of a mould having the desired shape, for example, when the core is being made of a transparent synthetic material. The core may also be given optical power by means of said curvature so that the core will have a converging effect and can take over a part of the function of the lens 3.

Figure 4:
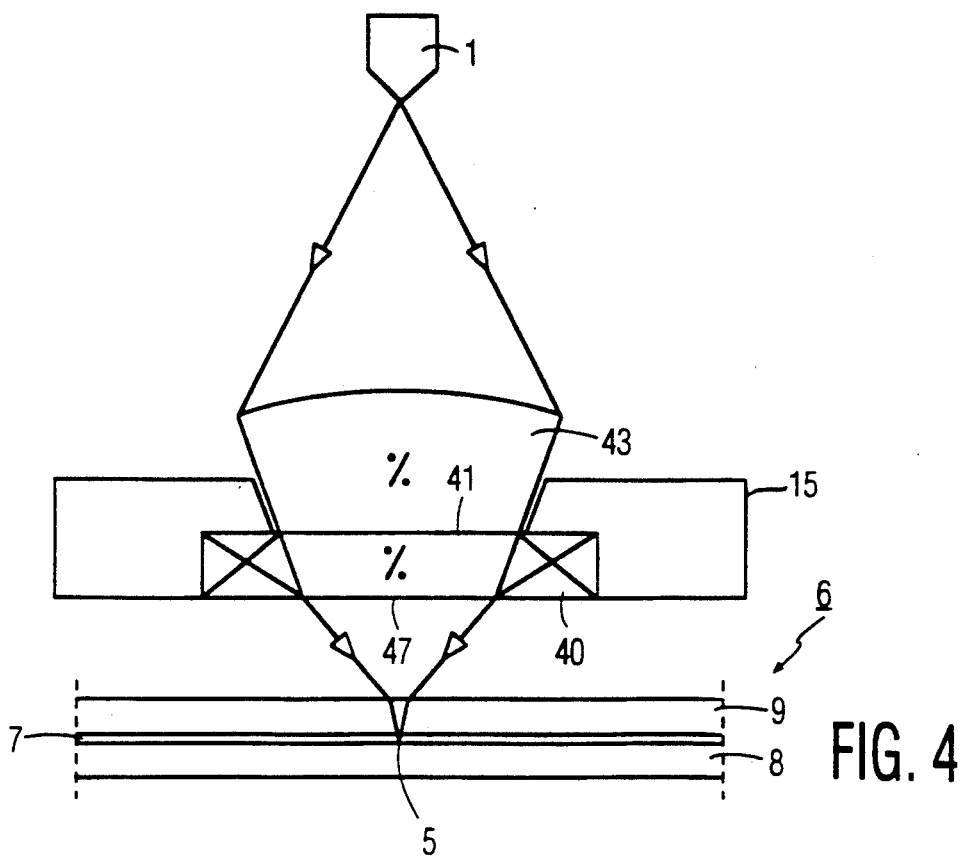
FIG. 4 shows a coil according to the invention with an integrated lens and coil. Identical reference numerals in the Figures refer to the same components.

FIG. 4 shows a device in which the core 41 and the lens 43 are integrated. The lens and the core may be cemented together or they may form a single optical element. The core in FIG. 4 may have a plane surface 47 so that the core can be manufactured more easily and hence at lower cost, while the required quality of the spot 5 is realised when using a satisfactory lens design.

To inhibit reflection losses on the surfaces such as 36 and 37 of the core 31, these surfaces may be provided with an anti-reflection coating.

It is recommendable to provide the winding 10 with a protective coating at the lower side of the coil so that the vulnerable turns are not damaged in case of contact with the record carrier. The winding may also be protected by causing the lower side, for example side 37 of the core 31, to project slightly below the coil so that only this part may come into contact with the record carrier. This core part is preferably given a convex shape. This has the further advantage that the rays in the core extend more parallel to the optical axis than when using a flat lower side so that the diameter of the core of the coil can even be further reduced.

By providing the coil with a yoke 15 of magnetic material, the magnetic field at the location of the spot 5 is further increased. The magnetic material may be, for example ferrite. The geometry of the yoke shown in FIG. 4 shows the greatest increase of the field. It is found that addition of turns to the lower side of the winding 40 yields a greater increase of the field than providing magnetic material at that side. The increase of the field by providing the yoke may be a factor of 1.7, dependent on the geometry of the coil. If the field remains the same, the current through the coil with the yoke can be decreased by this factor and the dissipation in the coil can be reduced by a factor of 3. The yoke 15 has the additional advantage that it enhances the dissipation of heat generated in the coil so that the coil can carry a larger current and hence generate more field. A yoke 15, which is of course provided with an aperture to pass the radiation beam 24 or 34, may alternatively be used in the devices shown in FIGS. 2 and 3.

As is known, a magneto-optical record carrier can be read by means of the device described hereinbefore. The coil is then not energized and the beam 4 whose intensity is decreased is used as a read beam. The state of polarisation of the read beam is changed by the inscribed magnetic domains. The beam from the record carrier is coupled out of the path of beam 4 by a beam separator, whereafter the change of the state of polarisation can be detected. For further details about reading and erasing, reference is made to European Patent Application no. 0 341 778, to which U.S. Pat. No. 5,014,254 corresponds.

We claim:

1. A device for scanning a magneto-optical recording layer, comprising a radiation source and an objective system for forming a radiation beam which is focused to a scanning spot on the recording layer, a magnet coil comprising a winding with an opening arranged between the objective system and the recording layer for generating a magnetic field at the location of the scanning spot, and a core disposed within said opening, characterized in that the core comprises a transparent non-magnetic material disposed throughout the height of the winding, said material having an index of refraction such that the vergence of the radiation in the core is smaller than the vergence of the radiation beam in the medium surrounding the coil, and the coil is arranged to have an opening whose inner diameter has a maximum value substantially equal to the maximum diameter of the radiation beam within the coil opening.

2. A device as claimed in claim 1, characterized in that said core is shaped as a truncated cone having an apex angle equal to the apex angle of the radiation beam in the core.

3. A device as claimed in claim 1, characterized in that said objective system is integrated with said core.

4. A device as claimed in claim 1, characterized in that said core has an end surface, facing the scanning spot, projecting from the winding opening.

5. A device as claimed in claim 4, wherein said winding has a radially outer perimeter and a side remote from said scanning spot, characterized in that said coil further comprises a yoke made of magnetic material, extending at least around the radially outer perimeter of the winding.

6. A device as claimed in claim 5, wherein said yoke additionally extends over only said side of the winding remote from said scanning spot.

7. A device as claimed in claim 3, wherein said winding has a radially outer perimeter and a side remote from said scanning spot, characterized in that said coil further comprises a yoke made of magnetic material, extending at least around the radially outer perimeter of the winding.

8. A device as claimed in claim 7, wherein said yoke additionally extends over only said side of the winding remote from said scanning spot.

9. A device as claimed in claim 1, wherein said winding has a radially outer perimeter and a side remote from said scanning spot, characterized in that said coil further comprises a yoke made of magnetic material, extending at least around the radially outer perimeter of the winding.

10. A device as claimed in claim 9, wherein said yoke additionally extends over only said side of the winding remote from said scanning spot.

11. A device for scanning a magneto-optical recording layer, comprising a radiation source and an objective system for forming a radiation beam which is focused to a scanning spot on the recording layer, a magnet coil comprising a winding with an opening arranged between the objective system and the recording layer for generating a magnetic field at the location of the scanning spot, and a core disposed within said opening, characterized in that the core comprises a transparent material disposed throughout the height of the winding, said material having an index of refraction such that the vergence of the radiation in the core is smaller than the vergence of the radiation beam in the medium surrounding the coil, said core has at least one curved end surface, and the coil is arranged to have an opening whose inner diameter has a maximum value substantially equal to the maximum diameter of the radiation beam within the coil opening.

12. A device as claimed in claim 11, characterized in that said core is shaped as a truncated cone having an apex angle equal to the apex angle of the radiation beam in the core.

13. A device as claimed in claim 11, characterized in that said curved end surface faces the scanning spot, and projects from the winding opening.

14. A device as claimed in claim 11, wherein said winding has a radially outer perimeter and a side remote from said scanning spot, characterized in that said coil further comprises a yoke made of magnetic material, extending at least around the radially outer perimeter of the winding.

15. A device as claimed in claim 14, wherein said yoke additionally extends over only said side of the winding remote from said scanning spot.

16. A device for scanning a magneto-optical recording layer, comprising a radiation source and an objective system for forming a radiation beam which is focused to a scanning spot on the recording layer, a magnet coil comprising a winding with an opening arranged between the objective system and the recording layer for generating a magnetic field at the location of the scanning spot, and a core disposed within said opening, characterized in that the core comprises a transparent non-magnetic material disposed throughout the height of the winding, said material having an index of refraction such that the vergence of the radiation in the core is smaller than the vergence of the radiation beam in the medium surrounding the coil, said core has at least one curved end surface, and the coil is arranged to have an opening whose inner diameter has a maximum value substantially equal to the maximum diameter of the radiation beam within the coil opening.

17. A device as claimed in claim 16, characterized in that said core is shaped as a truncated cone having an apex angle equal to the apex angle of the radiation beam in the core.

18. A device as claimed in claim 16, characterized in that said objective system is integrated with said core, and said core has an end surface, facing the scanning spot, projecting from the winding opening.

19. A device as claimed in claim 18, wherein said winding has a radially outer perimeter and a side remote from said scanning spot, characterized in that said coil further comprises a yoke made of magnetic material, extending at least around the radially outer perimeter of the winding.

20. A device as claimed in claim 19, wherein said yoke additionally extends over only said side of the winding remote from said scanning spot.

* * * * *